United States Patent
Gwun

(10) Patent No.: US 11,265,186 B2
(45) Date of Patent: Mar. 1, 2022

(54) REDUNDANCY ADMINISTRATING METHOD FOR VIRTUAL PRIVATE NETWORK AND NETWORK SWITCHING APPARATUS WITH THE SAME METHOD IMPLEMENTED THEREIN

(71) Applicant: DASAN Network Solutions, Inc., Seongnam-si (KR)

(72) Inventor: Gye Rok Gwun, Gwangju-si (KR)

(73) Assignee: DASAN Network Solutions, Inc., Seongnam-si (KR)

( * ) Notice: Subject to any disclaimer, the term of this patent is extended or adjusted under 35 U.S.C. 154(b) by 29 days.

(21) Appl. No.: 17/030,309

(22) Filed: Sep. 23, 2020

(65) Prior Publication Data

US 2021/0091973 A1 Mar. 25, 2021

(30) Foreign Application Priority Data

Sep. 23, 2019 (KR) .......................... 10-2019-0116527

(51) Int. Cl.
*H04L 12/437* (2006.01)
*H04L 61/5069* (2022.01)
(Continued)

(52) U.S. Cl.
CPC ........ *H04L 12/437* (2013.01); *H04L 12/4641* (2013.01); *H04L 61/2069* (2013.01);
(Continued)

(58) Field of Classification Search
CPC ....... H04L 12/28; H04L 12/437; H04L 61/20; H04L 61/2069; H04L 12/46; H04L 12/4641; H04L 12/4679; H04L 12/18; H04L 12/1845; H04L 2012/5641; H04L 2012/5642; H04L 2012/5643; H04L 65/4076; H04L 29/06455; H04L 29/12009;
(Continued)

(56) References Cited

U.S. PATENT DOCUMENTS 8,295,564 B2 * 10/2012 Hahn ...................... G06T 11/00
382/128
9,019,814 B1 * 4/2015 Mohanty ................. H04L 45/00
370/219
(Continued)

FOREIGN PATENT DOCUMENTS

KR  10-2002-0039557 A    5/2002
KR     2021-037086    *  4/2021    ............. H04L 12/24

OTHER PUBLICATIONS

Korean office action dated Jun. 29, 2020 from Korean Industrial Property Office for Korean Application No. 10-2019-0116527.
(Continued)

*Primary Examiner* — Warner Wong
(74) *Attorney, Agent, or Firm* — Insight Law Group, PLLC; Seung Lee

(57) ABSTRACT

At least two egress provider edge (PE) routers of a service provider core network of a virtual private network are set as an anycast transport node. The same logical IP address and the same interior label are allocated to the egress PE routers. The same service label is allocated to virtual private networks, or private routes of virtual private networks, serviced by the two egress PE routers constituting the anycast transport node.

14 Claims, 4 Drawing Sheets

(51) Int. Cl.
*H04L 12/46* (2006.01)
*H04L 65/611* (2022.01)
*H04L 61/00* (2022.01)
*H04L 61/30* (2022.01)
*H04L 12/18* (2006.01)

(52) U.S. Cl.
CPC ........ *H04L 12/18* (2013.01); *H04L 29/06455* (2013.01); *H04L 29/12009* (2013.01); *H04L 61/30* (2013.01)

(58) Field of Classification Search
CPC ........... H04L 29/12292; H04L 29/1233; H04L 61/00; H04L 61/30; H04L 47/806; H04L 49/201
See application file for complete search history.

(56) References Cited

U.S. PATENT DOCUMENTS

| | | | |
|---|---|---|---|
| 9,525,619 B2 * | 12/2016 | Filsfils | H04L 45/34 |
| 2005/0149531 A1 | 7/2005 | Srivastava | |
| 2010/0008222 A1 * | 1/2010 | Le Roux | H04L 45/50 370/228 |
| 2011/0164617 A1 * | 7/2011 | Yong | H04L 49/354 370/392 |
| 2011/0194404 A1 * | 8/2011 | Kluger | H04L 12/437 370/218 |
| 2015/0009803 A1 * | 1/2015 | Bashandy | H04L 41/0668 370/219 |
| 2015/0009806 A1 * | 1/2015 | Bashandy | H04L 45/28 370/221 |
| 2016/0119156 A1 * | 4/2016 | Drake | H04L 45/16 709/223 |
| 2017/0288948 A1 * | 10/2017 | Singh | H04L 45/50 |
| 2018/0351882 A1 * | 12/2018 | Jeganathan | H04L 45/50 |
| 2019/0132241 A1 * | 5/2019 | Vattem | H04L 12/4641 |

OTHER PUBLICATIONS

Krzysztof Walkowiak, Shared Backup Path Protection for Anycast and Unicast Flows Using the Node-Link Notation, 2011 IEEE International Conference on Communications (ICC), Kyoto, Jun. 5-9, 2011.

* cited by examiner

REDUNDANCY ADMINISTRATING METHOD FOR VIRTUAL PRIVATE NETWORK AND NETWORK SWITCHING APPARATUS WITH THE SAME METHOD IMPLEMENTED THEREIN

CROSS-REFERENCE TO RELATED APPLICATION(S)

This application claims priority from Korean Patent Application No. 10-2019-0116527, filed on Sep. 23, 2019, in the Korean Intellectual Property Office, the disclosure of which is incorporated herein by reference in its entirety.

BACKGROUND

1. Field

The following description relates to a network technique, and more particularly, to a network administrating technique for a virtual private network.

2. Description of Related Art

A layer 3 (L3) virtual private network (VPN) provides VPN services by exchanging VPN-related information between service provider edge devices through border gateway protocol (BGP) signaling. Through the L3 VPN, each customer can use a shared core network of a service provider as an independent private network. In the case of the BGP, reachability information is sequentially forwarded as a path vector protocol. Thus, when a network topology is changed due to router failure or the like, a BGP-based convergence time is increased depending on the number of prefixes.

BGP-Prefix Independent Convergence (PIC), which is proposed to solve the above problem, ensures a constant convergence time regardless of the number of prefixes. BGP-PIC indirectly links, to a hierarchical and shared forwarding chain, information on a route reaching the next hop. When a change occurs in the network topology, the convergence time is reduced correspondingly by modifying an associated path list.

However, in the case of the VPN, when a failure occurs in a primary egress provider edge (PE) router, an ingress PE router performs recovery by deleting corresponding PE information from a BGP path list as soon as the failure is detected. However, to this end, a plurality of paths between an ingress PE and an egress PE may be set in advance in a path list. Also, a high-speed failure detection algorithm such as Multi-Hop Bidirectional Failure Detection (MH-BFD) should be applied to quickly detect a failure, but the application may be difficult depending on the network environment. In particular, in a ring topology, it may not be possible to accurately detect a faulty node, and thus it may not be possible to respond with the BGP-PIC.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a solution that can respond quickly when a failure occurs in a virtual private network.

The following description also relates to providing a solution that can naturally respond without a separate process when a failure occurs in a virtual private network.

The following description also relates to solving a failure situation to which BGP-PIC cannot respond.

In one general aspect, at least two egress provider edge (PE) routers of a service provider core network of a virtual private network are set as an anycast transport node. According to this aspect, at least two egress PE routers of a service provider core network of a virtual private network are set as an anycast node having the same logical IP address. In addition, the same interior label for routing in a service provider core network of a virtual private network is allocated to two egress PE routers set as an anycast node.

In another aspect, the same service label is allocated to virtual private networks, or private routes of virtual private networks, serviced by the two egress PE routers constituting the anycast transport node.

In still another aspect, a service label for each virtual private network or for each private route of a virtual private network may be determined through a negotiation between at least two egress PE routers.

Other features and aspects will be apparent from the following detailed description, the drawings, and the claims.

Figure 1:
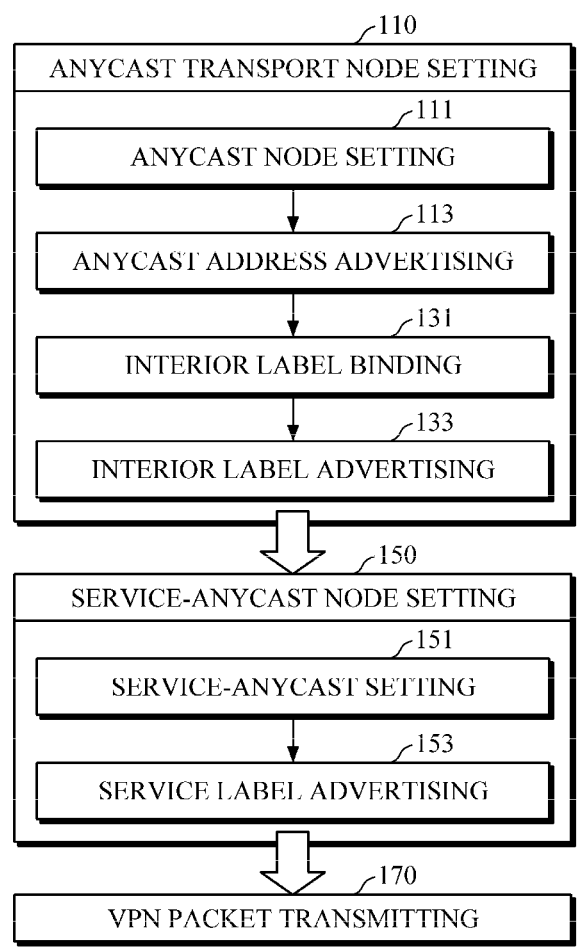
FIG. 1 is a flowchart illustrating a configuration of a virtual private network administrating method according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and additional aspects are embodied through embodiments to be described with reference to the accompanying drawings. It is to be understood that elements in each embodiment can be combined in various forms unless otherwise stated or as long as there is no contradiction therebetween.

FIG. 1 is a flowchart illustrating a configuration of a virtual private network administrating method according to an embodiment. According to an aspect of the proposed invention, at least two egress provider edge (PE) routers of a service provider core network of a virtual private network are set as an anycast transport node. Referring to FIG. 1, the proposed virtual private network administrating method includes an anycast node setting operation 111 and an interior label binding operation 131. According to an aspect of the proposed invention, the anycast node setting operation 111 includes setting at least two egress PE routers of a service provider core network of a virtual private network as anycast nodes having the same logical internet protocol (IP) address.

In network communication, a transmission technique may be classified as unicast, multicast, broadcast, and anycast depending on the receiver. In the anycast, traffic is received by a receiver determined among a group of receivers having the same address on the basis of a least-expensive routing metric. Typically, in terms of a network topology, a receiver closest to a transmitter has the minimum route cost.

The virtual private network, which is an overlay network overlaid with a physical network, allows transport nodes to tunnel virtual private network traffic. To this end, a PE router generates a virtual route forwarding (VRF) instance for each customer and administrates a VRF routing table. Also, the PE router administrates a global routing table responsible for routing information related to each node in the service provider network.

Assuming that the virtual private network is an overlay network overlaid with a physical network, a group of egress PE routers set as one anycast node according to the proposed invention may be regarded as one transport node in which a tunnel for forwarding anycast traffic is set in the virtual private network service. In this regard, herein, the transport node is referred to as an anycast transport node.

In an embodiment, two egress PE routers are designated as an anycast transport node. The same IP address may be set for a specific loopback interface of the egress PE routers designated as an anycast transport node. For example, a network administrator may access two egress PE routers through an administration terminal to set the same logical IP address for one network interface. According to the RFC 3031 standard, which is a forwarding method of a data plane of a transport network of a virtual private network service, such an interior label is bound to the same logical IP address set for the loopback interface of the primary egress PE router.

In another embodiment, the egress PE router may transmit anycast transport information to the ingress PE router, and the ingress PE router may designate the next hop as an anycast node. In this embodiment, when private route information of a virtual private network received by the ingress PE router from the egress PE router is installed in an administration table, e.g., an FIB, anycast transport information other than the node information of the egress PE router, i.e., a logical IP address set in an anycast node setting operation, may be installed as the next hop. Thus, when transmitting service traffic, the ingress PE router uses the anycast address of the egress PE router.

One of the two egress PE routers which has the minimum routing cost, i.e., which is closest in terms of a topology with the ingress PE router, is a primary egress PE router, which is configured to receive traffic from an ingress node, and the other is a backup egress PE router. The PE routers assign a kind of redundancy feature to the core network.

Referring to FIG. 1 again, according to an aspect, in the interior label binding operation 131, the same interior label for routing in a service provider core network of a virtual private network is allocated to the two egress PE routers which are set as the anycast nodes. That is, in the anycast node setting operation 111, the same interior label bound to the same IP address set for a specific loopback interface is allocated to the egress PE routers. For example, a network administrator may access two egress PE routers through an administration terminal to set the same interior label.

In an embodiment, the interior label is an interior gateway protocol (IGP) label. The IGP label is label information necessary to reach the egress PE router from the ingress PE router. When the virtual private network is a multi-protocol label switching network, the interior label may be an MPLS label. When the virtual private network is a segment routing cloud, the interior label may be a segment routing identifier (SID). In the case of the MPLS/segment routing cloud, the forwarding method of the data plane follows the RFC3031 standard. The ingress PE router pushes a label bound to a destination address, and each transit router present along a route checks and forwards the corresponding label (swap/continue) and determines whether the corresponding label is a label allocated by the corresponding transit router and then removes the corresponding label when the destination is reached (pop/next). Such label processing of the routers is referred to as push/swap/pop in the MPLS and is referred to as push/continue/next in the segment routing.

When the primary egress PE router fails, a corresponding backup egress PE router may process packets from an ingress PE router having a logical IP address and interior label allocated by the egress PE router according to one aspect.

According to an additional aspect, the virtual private network administrating method may further include an anycast IP address advertising operation and an interior label advertising operation. Referring to FIG. 1 again, the anycast IP address advertising operation 113 includes advertising a logical IP address of anycast nodes for which at least two egress PE routers are set. In an embodiment, egress PE routers for which the same logical IP address is set advertise the logical IP address to their adjacent routers. In addition, in the interior label advertising operation 133, at least two egress PE routers advertise the bound interior label. The anycast IP address advertising operation 113 and the interior label advertising operation 133 may be performed after the anycast node setting operation 111 and the interior label binding operation 131 and/or in the reverse order.

In an embodiment, the logical IP address and the interior label, i.e., an MPLS label/segment routing identifier (SID) may be advertised according to label distribution protocol (LDP)/IGP standard. In the case of a network that supports IP/MPLS, the loopback address of the anycast transport node may be advertised according to the conventional IGP, i.e., the open shortest path first (OSPF) standard of RFC 2328 and the intra-domain routing protocol (ISIS) standard of RFC 1142. Also, the interior label bound to the same logical IP address set for the loopback interface may be advertised by a label distribution protocol (LDP) of the RFC 3031 MPLS standard. Also, in the case of a network that supports segment routing of the RFC 8402 standard, SID may be distributed by extended IGP without requiring a separate label distribution protocol. In this case, the IP address and the interior label, i.e., SID, may be advertised at the same time.

Egress or ingress PE routers of a virtual private network core administrate a VRF routing table in addition to the global routing table associated with each node. The egress PE router checks the virtual private network (VPN) label of a received packet and then forwards the packet to corresponding VRF. According to the above aspect, when the primary egress PE router fails, a backup egress PE router attempts to process packets from the ingress PE router with a logical IP address and interior label allocated by the egress PE router according to one aspect. However, when the result of checking the VPN label is that the VPN label is not serviced by the egress PE router, the egress PE router does not forward the corresponding packet to a customer edge router and drops the packet.

According to an additional aspect of the proposed invention, the virtual private network administrating method implements service-anycast. The service-anycast may be implemented by allocating the same service label to virtual private networks, or private routes of virtual private networks, serviced by the two egress PE routers constituting the anycast transport node.

Referring to FIG. 1 again, the virtual private network administrating method may further include a service-anycast setting operation 151 and a service label advertising operation 153. In the service-anycast setting operation 151, the same service label may be allocated to virtual private networks or private routes of virtual private networks serviced by at least two egress PE routers. In the service label advertising operation 153, at least two egress PE routers advertise the allocated service label. In an embodiment, the service label may be a VPN label. A VPN label is label information allocated by an egress PE router to each virtual private network or each route of a virtual private network.

When a packet is received, an egress PE router checks the VPN label. Then, the egress PE router performs routing when the VPN label is the same as a VPN label allocated by the egress PE router and performs dropping otherwise. When a primary egress PE router fails, a corresponding backup egress PE router may process packets from an ingress PE router with a logical IP address and interior label allocated by the egress PE according to one aspect.

For example, a network administrator may access two egress PE routers through an administration terminal to set the same interior label for virtual private networks, or private routes of virtual private networks, serviced by the egress PE routers.

According to an additional aspect, the service-anycast setting operation may include a service label negotiation operation. In this case, by negotiation between at least two egress PE routers, service labels for the virtual private networks, or the private routes of the virtual private networks, serviced by the egress PE routers may be determined. In an embodiment, at least two egress PE routers belonging to a group set as service-anycast exchange service label information assigned to virtual private networks or private routes of virtual private networks. The routers share a service label determination rule for determining service labels in advance. For example, a service label with the highest value may be determined as a common service label on the basis of the service label information acquired through the exchange. In an embodiment, when a service label determined according to the service label determination rule is not an original service label of each router, the corresponding router withdraws the old service label, sets the new service label as its own service label, and performs advertisement to other routers.

Figure 2:
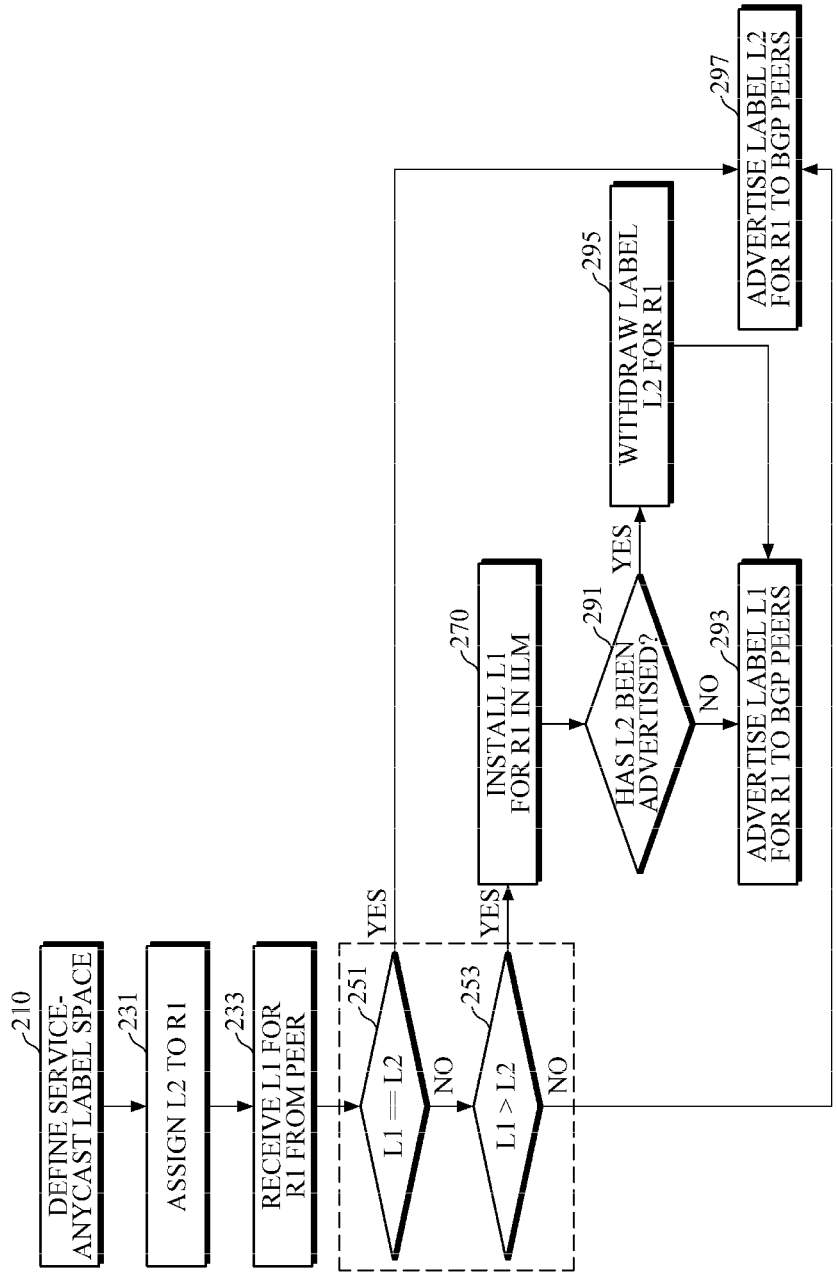
FIG. 2 is a flowchart illustrating a configuration of an embodiment of a service label processing method of one egress provider edge (PE) router which is set as service-anycast.

FIG. 2 is a flowchart illustrating a configuration of an embodiment of a service label processing method of one egress PE router that is set as service-anycast. First, a label space used as service-unicast is defined and shared between all egress PE routers (operation 210). Subsequently, an egress PE router allocates a service label L2 to a private route R1 of a virtual private network processed by the egress PE router (operation 231). A value determined sequentially among available service labels other than service labels advertised to other peers in the label space may be allocated to the private route. Subsequently, a service label L1, which is allocated to the private route R1 by another peer belonging to the same service-anycast group (i.e., another egress PE router), is received from the other egress PE router.

Subsequently, a process of determining a common service label is performed. In the shown embodiment, a service label determination rule is for determining the maximum label in the group as the common service label. First, the process includes comparing the service label L2, which is allocated by the egress PE router, to the service label L1, which is received from the other peer (operations 251 and 253). In this embodiment, a label value is subject to the comparison, but the present invention is not limited thereto. For example, another value included in border gateway protocol (BGP) attributes, e.g., a router identifier (ID), may be used. When the comparison result is that the two label values are the same, the value L2 is advertised to BGP peers as a service label for the private route R1 (operation 297). For example, the advertisement of the service label follows Section 4, which is entitled VPN route distribution via BGP, in the standard "BGP/MPLS IP Virtual Private Networks" of RFC 4364.

When L1 is larger between the two label values (operation 253), L1 is selected as the common service label according to the service label determination rule. The egress PE router installs the determined label value L1 in an incoming label map (ILM) as the service label of the private route R1 (operation 270). Subsequently, the egress PE router checks whether L2 has already been advertised (operation 291). When L2 has not been advertised yet, the determined label value L1 is advertised as the service label for the private route R1 (operation 293). When L2 has been advertised, the service label L2 for R1 is withdrawn (operation 295), and L1 is advertised to BGP peers (operation 293).

According to another aspect, the service label may be determined by an ingress PE router. That is, an ingress PE router may determine a service label for a specific virtual private network or a specific private route of a virtual private network and forward the service label to egress PE routers belonging to a corresponding service-anycast node. For example, this method is applicable when the egress PE routers belonging to the service-anycast node do not determine the service label through negotiation. The ingress PE router may allocate an upstream label to specific VRF and advertise the upstream label to the egress PE routers belonging to the corresponding service-anycast node. The egress PE routers belonging to the service-anycast node receive and install the upstream level in the ILM. The allocation of the upstream label may follow the standard "MPLS Upstream Label Assignment and Context Specific Label Space" of RFC 5331.

According to another additional aspect, the virtual private network administrating method may further include a VPN pack transmission operation 170. In the VPN packet transmission operation 170, the ingress PE router transmits service traffic using an interior label, which is allocated to an anycast address of the egress PE router in the interior label binding operation 131, as a transport label.

In an embodiment, the same IP address may be set for a specific loopback interface of the egress PE routers designated as an anycast transport node. According to the RFC 3031 standard, which is a forwarding method of a data plane of a transport network of a virtual private network service, such an interior label is bound to the same logical IP address set for the loopback interface of the primary egress PE router.

In another embodiment, when route information received by the ingress PE router from the egress PE router is installed in an administration table, e.g., an FIB, anycast transport information other than the node information of the egress PE router, i.e., a logical IP address set in an anycast node setting operation, may be installed as the next hop. Typically, the VPN of the BGP installs the loopback address of the egress PE router (a BGP peer neighbor address) as a next hop when installing the route information received from the egress PE router in the FIB. Thus, when transmitting service traffic, the ingress PE router uses the anycast address of the egress PE router.

Figure 3:
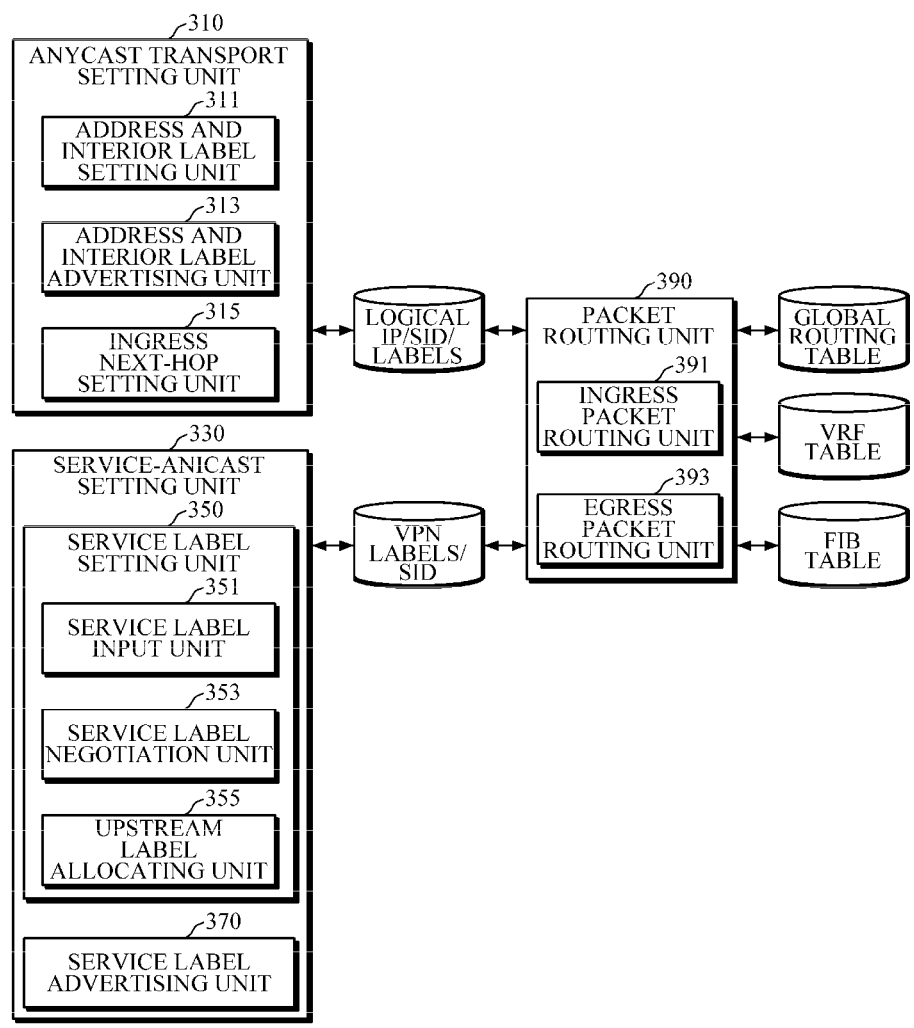
FIG. 3 is a block diagram showing a configuration of a network switching apparatus according to an embodiment.

FIG. 3 is a block diagram showing a configuration of a network switching apparatus according to an embodiment. Each block in the figure may refer to all or part of hardware such as a network interface inside the network switching apparatus or one or more functional modules in program instructions that are executed in a microprocessor.

As shown in FIG. 3, the network switching apparatus according to an embodiment includes an anycast transport setting unit 310. The anycast transport setting unit 310 is provided in each egress PE router to set at least two egress PE routers as an anycast transport node in a service provider core network of a virtual private network. According to an aspect, the anycast transport setting unit 310 includes an address and interior label setting unit 311 and an address and interior label advertising unit 313. The address and interior label setting unit 311 sets a logical IP address and an interior label of an egress PE router as a logical IP address of the anycast node and an interior label bound to the logical IP address in order to set at least two egress PE routers as an anycast transport node. The address and interior label advertising unit 313 advertises the set logical IP address and interior label. This processing is similar to that described above with reference to FIG. 1.

According to another aspect, the network switching apparatus may further include an ingress next-hop setting unit 135. When installing route information received by an ingress PE router of a service provider core network of a virtual private network from an egress PE router in an administration table, e.g., an FIB, the ingress next-hop setting unit 135 installs an anycast logical IP address of the egress PE router. Thus, when transmitting service traffic, the ingress PE router uses the anycast address of the egress PE router.

According to another aspect, the network switching apparatus may further include a service-anycast setting unit 330. In an embodiment, the service-anycast setting unit 330 may include a service label setting unit 350 and a service label advertising unit 370. The service label setting unit 350 allocates the same service label as those of other egress PE routers belonging to service-anycast to a virtual private network, or a private route of a virtual private network, serviced by the network switching apparatus. The service label advertising unit 370 advertises the set service label to other peers.

The service label setting unit 350 may include a service label input unit 351. The service label input unit 351 sets and claims a service label with a value input from an administration terminal. According to an additional aspect, the service label setting unit 350 may include a service label negotiation unit 353. The service label negotiation unit 353 determines a service label through negotiations with other egress PE routers which belong to anycast nodes. According to an additional aspect, the service label setting unit 350 may include an upstream label allocating unit 355. When the network switching apparatus operates as an ingress PE router, the upstream label allocating unit 355 determines a service label for a specific virtual private network or a specific private route of a virtual private network and forwards the service label to egress PE routers belonging to a correspond service-anycast node. The service-anycast setting operation is similar to that described above with reference to FIG. 1.

The packet routing unit 390 routes and sends packets input (ingress) to an input port to an appropriate output port according to routing rules. According to an aspect, the packet routing unit 390 may include an ingress packet routing unit 391. When the network switching apparatus operates as an ingress PE router, the ingress packet routing unit 391 transmits service traffic using, as a transport label, a logical IP address allocated by the egress PE router set as the anycast-transport node and an interior label bound to the logical IP address.

When a packet is received from a customer edge router, the ingress PE router pushes a VPN label allocated and forwarded by a remote egress PE router and an IGP label necessary to reach the remove egress PE router into a packet. Routers on a router reaching an egress PE router in a core network forward packets to the egress PE router with reference to only the IGP label.

The egress packet routing unit 393 may operate similarly to egress packet routing of a general virtual private network. When a packet is received from the egress PE router, the IGP label has already been removed (popped) from the previous node, and only the VPN label allocated by the egress PE router is present. The egress router determines a VRF table with reference to the VPN label and routes a packet to a corresponding customer edge router with reference to routing information in the corresponding VRF table.

Figure 4:
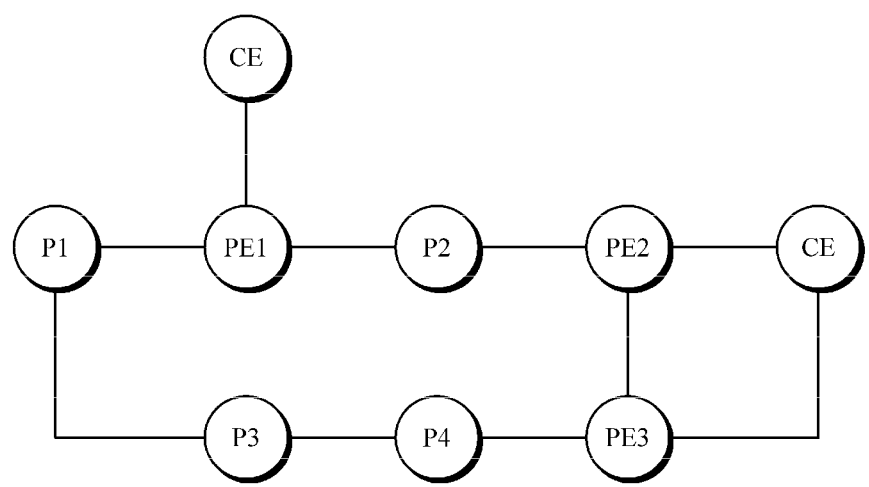
FIG. 4 shows a virtual private network having an example topology in order to describe the operation of the proposed invention.

FIG. 4 shows a virtual private network having an example topology in order to describe the operation of the proposed invention. When an ingress PE router PE1 transmits a packet received from CE to a primary egress router PE2, label/SID information corresponding to the loopback address of the primary egress router PE3 is encapsulated in the packet as the transport information. PE1 pushes the IGP/LDP label to be forwarded to PE2 and a label allocated by PE2 into a received packet and then transmits the received packet through P2. In this case, when a failure occurs in PE2, PE3 drops the packet even though fast re-route (FRR) operates in P2. Since a route to PE2 disappears, PE3 fails to transmit and drops the corresponding packet cannot be transmitted and is dropped.

According to an aspect of the proposed invention, the two egress PE routers PE2 and PE3 are designated as an anycast transport node. That is, the egress PE routers PE2 and PE3 set the same IP address to a specific loopback interface, set the same MPLS label/segment routing identifier (SID), and advertise corresponding information to LDP/IGP. When installing route information received from the egress PE router in an FIB, the ingress PE router PE1 installs anycast transport information other than nodal information of the egress PE routers as a next hop. Typically, the VPN of the BGP installs the loopback address of the egress PE router (a BGP peer neighbor address) as a next hop when installing the route information received from the egress PE router in the FIB.

When the ingress PE router PE1 transmits a VPN packet to the anycast transport node, PE3 can process the corresponding packet without separate processing even though a failure occurs in the egress PE node PE2.

However, even though an anycast transport function is implemented, service labels allocated by the primary egress PE router PE2 and the backup egress PE router PE3 may be different. In this case, when the primary egress PE router PE2 fails, the backup egress PE router PE3 drops a corresponding packet in a process for processing the corresponding packet according to an anycast transport function because the service label is not allocated by the backup egress PE router PE3.

According to another aspect of the proposed invention, the same label may be allocated to VRF routes serviced by the egress PE routers PE2 and PE3. When the primary egress PE router PE2 fails, PE1 guides a packet to a route P1-P3- . . . according to an FRR function. Thus, the packet reaches the backup egress PE router PE3. When the corresponding packet is received, the backup egress PE router PE3 transmits a packet to an associated VRF and then forwards the packet to a corresponding CE router because the service label is the same as the service label of the backup egress PE router PE3.

According to the proposed invention, a node failure in a primary egress PE node in a virtual private network is replaced by a link failure in terms of an ingress PE node or other nodes in the network, so that it is possible to respond with only fast re-route (FRR).

Furthermore, according to the proposed invention, sine an ingress PE node does not need to check the liveness of a primary egress PE node, there is no need to rely on MH-BFD, and thus it is possible to reduce recovery time.

Furthermore, since the ingress PE router transmits a packet to a single virtual node, there is no need to preset route information separately received from a backup egress PE node in an FIB. Accordingly, implementation complexity is avoided.

Furthermore, according to the proposed invention, the protection of a service layer can be guaranteed only with an FRR function of a transporter layer, and thus there is no need for a separate service layer protecting solution.

The present invention has been described above with reference to embodiments referring to the accompanying drawings but is not limited thereto. Rather, the present invention should be construed as encompassing various modifications that may be apparent to those skilled in the art. The appended claims are intended to cover such modifications.

What is claimed is:

1. A method of administrating a virtual private network, the method comprising an anycast node setting operation in which at least two egress provider edge (PE) routers of a service provider core network of a virtual private network as anycast nodes with the same logical internet protocol (IP) address; and an interior label binding operation in which the same interior label for routing in the service provider core network of the virtual private network is allocated to the at least two egress PE routers set as the anycast nodes.

2. The method of claim 1, wherein the anycast node setting operation comprises setting the same logical IP address for specific loopback interfaces of the at least two egress PE routers of the service provider core network of the virtual private network.

3. The method of claim 1, wherein the anycast node setting operation comprises installing the logical IP address set in the anycast node setting operation when installing route information received from an egress PE router by an ingress PE router of the service provider core network of the virtual private network in an administration table.

4. The method of claim 1, further comprising: an anycast IP address advertising operation in which the at least two egress PE routers advertise the logical IP address of the anycast node; and an interior label advertising operation in which the at least two egress PE routers advertise a bound interior label.

5. The method of claim 1, further comprising: a service-anycast setting operation in which the same service label is allocated to virtual private networks, or private routes of virtual private networks, serviced by the at least two egress routers; and a service label advertising operation in which the at least two egress PE routers advertise the service label.

6. The method of claim 5, wherein the service-anycast setting operation comprises a service label negotiation operation in which the service label for the virtual private networks or the private routes of the virtual private networks is determined through a negotiation between the at least two egress PE routers.

7. The method of claim 5, wherein the service-anycast setting operation comprises an upstream label allocation operation in which an ingress PE router determines a service label for a specific virtual private network or a specific private route of a virtual private network and forwards the service label to egress PE routers belonging to a corresponding service-anycast node.

8. The method of claim 1, further comprising a virtual private network (VPN) packet transmission operation in which an ingress PE router transmits service traffic using an interior label, which is allocated to an anycast address of an egress PE router in the interior label binding operation, as a transport label.

9. A network switching apparatus comprising: an address and interior label setting unit configured to set the same logical IP address and the same interior label bound to the logical IP address for at least two egress PE routers set as an anycast transport node in a service provider core network of a virtual private network; and an address and interior label advertising unit configured to advertise the set logical IP address and interior label.

10. The network switching apparatus of claim 9, further comprising an ingress next-hop setting unit configured to install an anycast logical IP address of an egress PE router when an ingress PE router of the service provider core network of the virtual private network installs route information received from the egress PE router in an administration table.

11. The network switching apparatus of claim 9, further comprising a service-anycast setting unit configured to allocate the same service label to virtual private networks, or private routes of virtual private networks, serviced by the at least two egress PE routers.

12. The network switching apparatus of claim 11, wherein the service-anycast setting unit comprises a service label negotiation unit configured to determine a service label through negotiations with other egress PE routers that belong to anycast nodes.

13. The network switching apparatus of claim 11, wherein the service-anycast setting unit comprises an upstream label allocating unit configured to determine a service label for a specific virtual private network or a specific private route of a virtual private network and forward the service label to egress PE routers which belong to a corresponding service-anycast node.

14. The network switching apparatus of claim 9, further comprising an ingress packet routing unit configured to transmit service traffic using, as a transport label, a logical IP address allocated by the egress PE router set as the anycast-transport node and an interior label bound to the logical IP address when the network switching apparatus operates as an ingress PE router.

* * * * *